(12) United States Patent
Tokoro et al.

(10) Patent No.: US 7,961,825 B2
(45) Date of Patent: Jun. 14, 2011

(54) DIVERSITY RECEIVER AND METHOD

(75) Inventors: Kenichi Tokoro, Kanagawa (JP); Takashi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1239 days.

(21) Appl. No.: 11/562,657

(22) Filed: Nov. 22, 2006

(65) Prior Publication Data

US 2007/0116161 A1 May 24, 2007

(30) Foreign Application Priority Data

Nov. 24, 2005 (JP) .................................. 2005-339352

(51) Int. Cl.
*H04B 7/10* (2006.01)

(52) U.S. Cl. ....... 375/347; 178/18.02; 342/77; 348/466; 365/185.09; 369/53.35; 714/746; 714/751; 714/E11.001

(58) Field of Classification Search .................. None
See application file for complete search history.

(56) References Cited

U.S. PATENT DOCUMENTS

| 5,933,466 | A | * | 8/1999 | Oshima et al. ................ 375/347 |
| 6,052,820 | A | * | 4/2000 | Yoshida ........................ 714/781 |
| 6,181,749 | B1 | * | 1/2001 | Urabe et al. .................. 375/267 |
| 6,901,125 | B2 | | 5/2005 | Ghazi-Moghadam et al. |
| 6,983,027 | B2 | | 1/2006 | Seki et al. |

FOREIGN PATENT DOCUMENTS

| CN | 1305277 A | 7/2001 |
| CN | 1178416 C | 12/2004 |
| EP | 1 301 003 B1 | 4/2003 |
| JP | 10-256967 | 9/1998 |
| JP | 11-150497 | 6/1999 |
| JP | 2001-156738 | 6/2001 |
| JP | 2002-359610 | 12/2002 |
| JP | 2005-12452 | 1/2005 |

* cited by examiner

*Primary Examiner* — David C. Payne
*Assistant Examiner* — Adolf Dsouza
(74) *Attorney, Agent, or Firm* — Oblon, Spivak, McClelland, Maier & Neustadt, L.L.P.

(57) ABSTRACT

Respective demodulated outputs from a plurality of branches 11a to 11d are fed to corresponding error correction units 13a to 13d and error-corrected. The error correction units 13a to 13d feed error signals to error determination units 14a to 14d. The error determination units 14a to 14d determine the error-incidence situations of the respective branches 11a to 11d and then output the determination results to a coefficient generation unit 15. Based on the results of determination by the error determination units 14a to 14d, the coefficient generation unit 15 obtains the synthesis coefficients for the respective branch outputs. The synthesis coefficients correspond to the error-incidence situations of the respective branch outputs and are appropriate values including no errors. By synthesizing the respective branch outputs by use of the synthesis coefficients, error-free data can be reproduced.

15 Claims, 7 Drawing Sheets

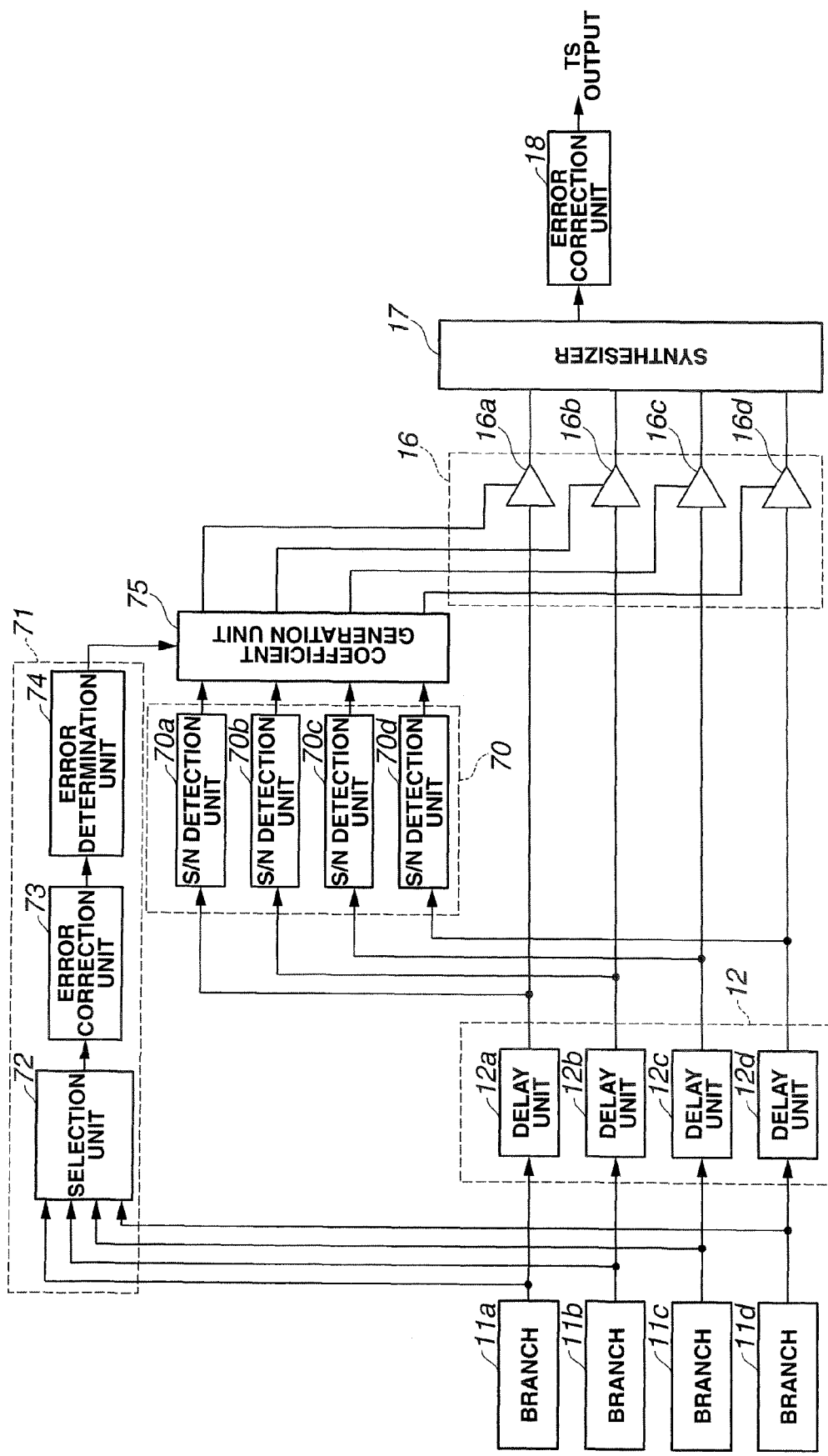

DIVERSITY RECEIVER AND METHOD

This application is based upon and claims the benefit of priority from the prior Japanese Patent Applications No. 2005-339352, filed in Japan on Nov. 24, 2005; the entire contents of which are incorporated herein by reference.

BACKGROUND OF THE INVENTION

1. Field of the Invention

The present invention relates to a diversity receiver and a method that are suitable for an Orthogonal-Frequency-Division-Multiplexing receiver or the like.

2. Description of the Prior Art

In recent years, in the field of mobile communication, the Orthogonal-Frequency-Division-Multiplexing (OFDM) method has been employed from time to time, for example, because of its superior properties against multipath. Because, also in terrestrial digital broadcasting, it is desired that the high-definition broadcast intended for stationary reception be able to be received also by mobile bodies such as vehicles, the OFDM method is employed.

In addition, in terrestrial digital broadcasting utilizing the OFDM method, a directivity control technique utilizing a plurality of antennas may be employed as a technique for raising the reception quality of mobile reception. In the foregoing diversity-method OFDM receiver, a plurality of branches as reception circuits are incorporated, and each branch OFDM-demodulates a reception signal so as to obtain complex symbol data.

For example, in the case of 4-channel diversity system, branches obtain four respective complex symbol data from the output terminals of four antennas. Then, by synthesizing the outputs from the branches, the complex symbol data based on a reception signal is obtained. The complex symbol data is error-corrected in an error correction circuit and through demapping processing corresponding to the constellation of the modulation method, converted into the original information signal.

Meanwhile, when four complex symbol data are synthesized, the synthesis proportions are determined in accordance with the respective reliability levels of the branch outputs. For example, in Japanese Patent Laid-Open No. 11-150497, an example is disclosed in which branch outputs are synthesized at synthesis proportions in accordance with the respective reliability levels of the branch outputs.

However, in determination of the reliability levels of the respective branch outputs, an error may occur that causes a branch output of low reliability to be synthesized at a high synthesis proportion, whereby the error rate of the complex symbol data may be enhanced.

For instance, the reliability levels of respective branch outputs may be determined based on the S/N ratios. The S/N ratio is obtained based on the distance between the position, of the complex symbol data from a branch, in the constellation and the symbol reference point. When, e.g., due to intrusion of large noise, the position, of the complex symbol data from a branch, in the constellation becomes close to a symbol reference point that is different from the symbol reference point with respect to which the complex symbol data should originally be demapped, the complex symbol data may be demapped into an erroneous code and the branch output may be determined to be a relatively high S/N ratio. In this case, the complex symbol data including an error is synthesized at a high synthesis proportion. As a result, the probability that the synthesized complex symbol data has an error is raised, whereby the quality of the reproduced information signal is deteriorated.

SUMMARY OF THE INVENTION

A diversity receiver according to an embodiment of the present invention includes an error correction device configured to error-correct respective demodulated outputs fed from a plurality of branches that demodulate respective reception signals from a plurality of antennas and to generate error information on error-uncorrectable data; an error determination device configured to determine error-incidence situations for the respective demodulated outputs, based on error information from the error correction device; and a coefficient generation unit configured to obtain synthesis coefficients for the respective demodulated outputs, based on the results of determination by the error determination device.

A diversity reception method according to an embodiment of the present invention includes error-correcting respective demodulated outputs fed from a plurality of branches that demodulate respective reception signals from a plurality of antennas and generating error information on error-uncorrectable data; determining error-incidence situations for the respective demodulated outputs, based on the error information; and obtaining synthesis coefficients for the respective demodulated outputs, based on the results of determination of error-incidence situations.

BRIEF DESCRIPTION OF THE DRAWINGS

FIG. 5 is a block diagram illustrating Embodiment 2 of the present invention;

DETAILED DESCRIPTION OF THE PREFERRED EMBODIMENTS

Figure 1:
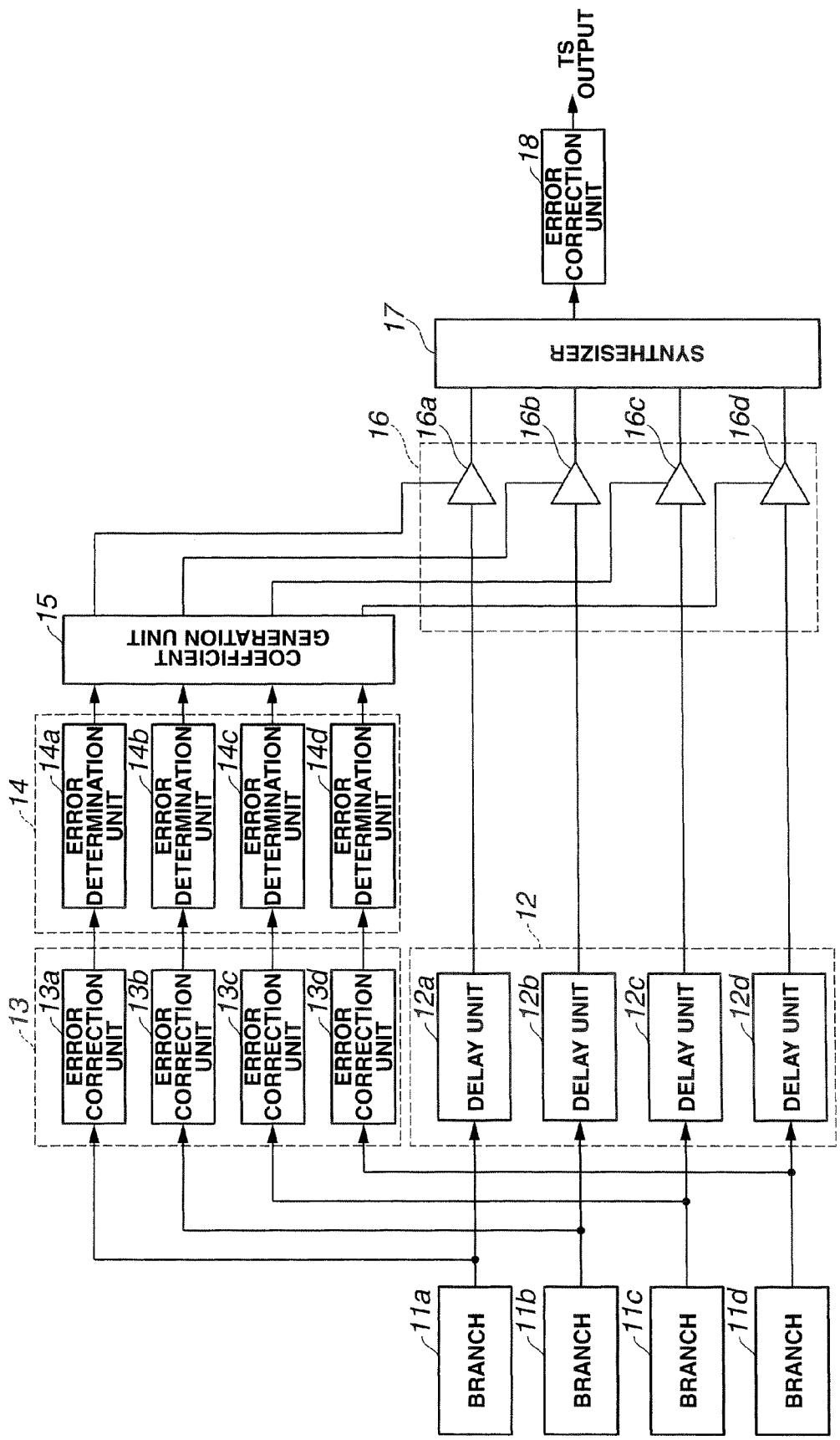
FIG. 1 is a block diagram illustrating a diversity receiver according to Embodiment 1 of the present invention.

Hereinafter, embodiments of the present invention will be explained in detail, with reference to the accompanying drawings. FIG. 1 is a block diagram illustrating a diversity receiver according to Embodiment 1 of the present invention. Embodiment 1 is an example in which the present invention is applied to an apparatus that receives an OFDM-method digital broadcasting signal.

The diversity receiver in FIG. 1 has four branches 11a to 11d for receiving an OFDM signal. The number of the branches is not limited to four. The branches 11a to 11d have the same configuration and each pick up baseband complex symbol data from an RF signal induced at an antenna.

Figure 2:
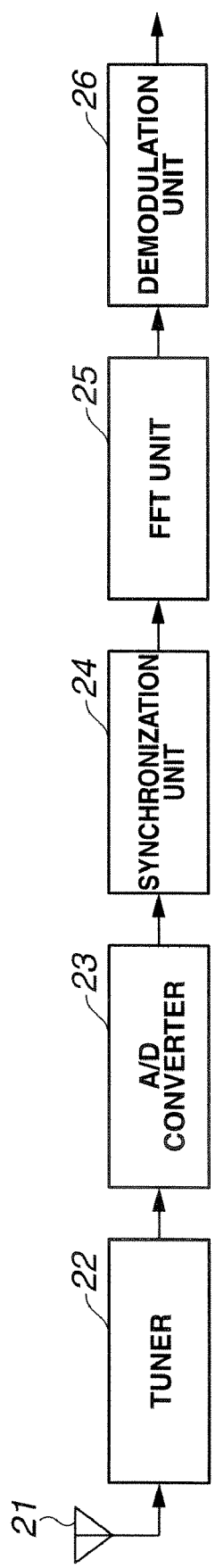
FIG. 2 is a block diagram illustrating the specific configurations of branches 11a to 11d.

FIG. 2 is a block diagram illustrating the specific configurations of the branches 11a to 11d. In addition, the branches 11a to 11d have the same configuration; in FIG. 2, only one branch is illustrated.

In FIG. 2, a digital-broadcast RF signal induced at an antenna 21 is fed to a tuner 22. The tuner 22 converts the inputted RF signal down to a baseband signal (complex baseband signal) and outputs the converted signal to an A/D converter 23. The A/D converter 23 converts the analogue baseband signal into a digital signal and outputs the digital complex baseband signal to a synchronization unit 24. The synchronization unit 24 performs synchronization processing such as clock synchronization or symbol synchronization.

Various kinds of synchronization signals and a complex baseband signal are fed from the synchronization unit 24 to an FFT unit 25; through FFT (fast Fourier transformation) processing, the FFT unit 25 converts the complex baseband signal, which is a time-axis signal, into a frequency-axis signal. The FFT unit 25 outputs I-axis complex symbol data and Q-axis complex symbol data to a demodulation unit 26. The demodulation unit 26 applies equalization processing and the like to the inputted data and outputs the resultant signals. As a result, the branches 11a to 11d each outputs complex symbol data based on an RF signal induced at the antenna for each branch.

The respective outputs of the branches 11a to 11d are fed through a delay device 12 to coefficient devices 16 and error correction devices 13. The delay device 12 have delay units 12a to 12d for delaying the respective outputs of the branches 11a to 11d. The delay units 12a to 12d delay the respective inputted complex symbol data by the time required for the computation of synthesis proportions described later and output the delayed data to coefficient units 16a to 16d of the coefficient device 16.

In Embodiment 1, in order to compute the synthesis proportions of the branches, error information obtained through error correction processing are utilized. That is, the error correction device 13 has error correction units 13a to 13d; the respective outputs of the branches 11a to 11d are fed to the corresponding error correction units 13a to 13d. The error correction units 13a to 13d apply error correction processing to respective inputted complex symbol data. The error correction units 13a to 13d each generates a correction error signal corresponding to data whose error cannot be corrected. As the correction error signal, a bit error signal that indicates an error per bit, a byte error signal that indicates an error per byte, a packet error signal that indicates an error per packet, or the like is conceivable. The error correction units 13a to 13d each can output at least one kind of the foregoing error signals.

The respective error signals from the error correction units 13a to 13d are fed to corresponding error determination units 14a to 14d that configure an error determination device 14. The error determination units 14a to 14d determine the error-incidence situations of the respective outputs of the branches 11a to 11d, based on the error signals from the error correction units 13a to 13d, and output the determination results to a coefficient generation unit 15. For example, based on the error signals, the error determination units 14a to 14d each may obtain the number of errors that occur within a predetermined time and output to the coefficient generation unit 15 information corresponding to the number of errors.

Figure 3:
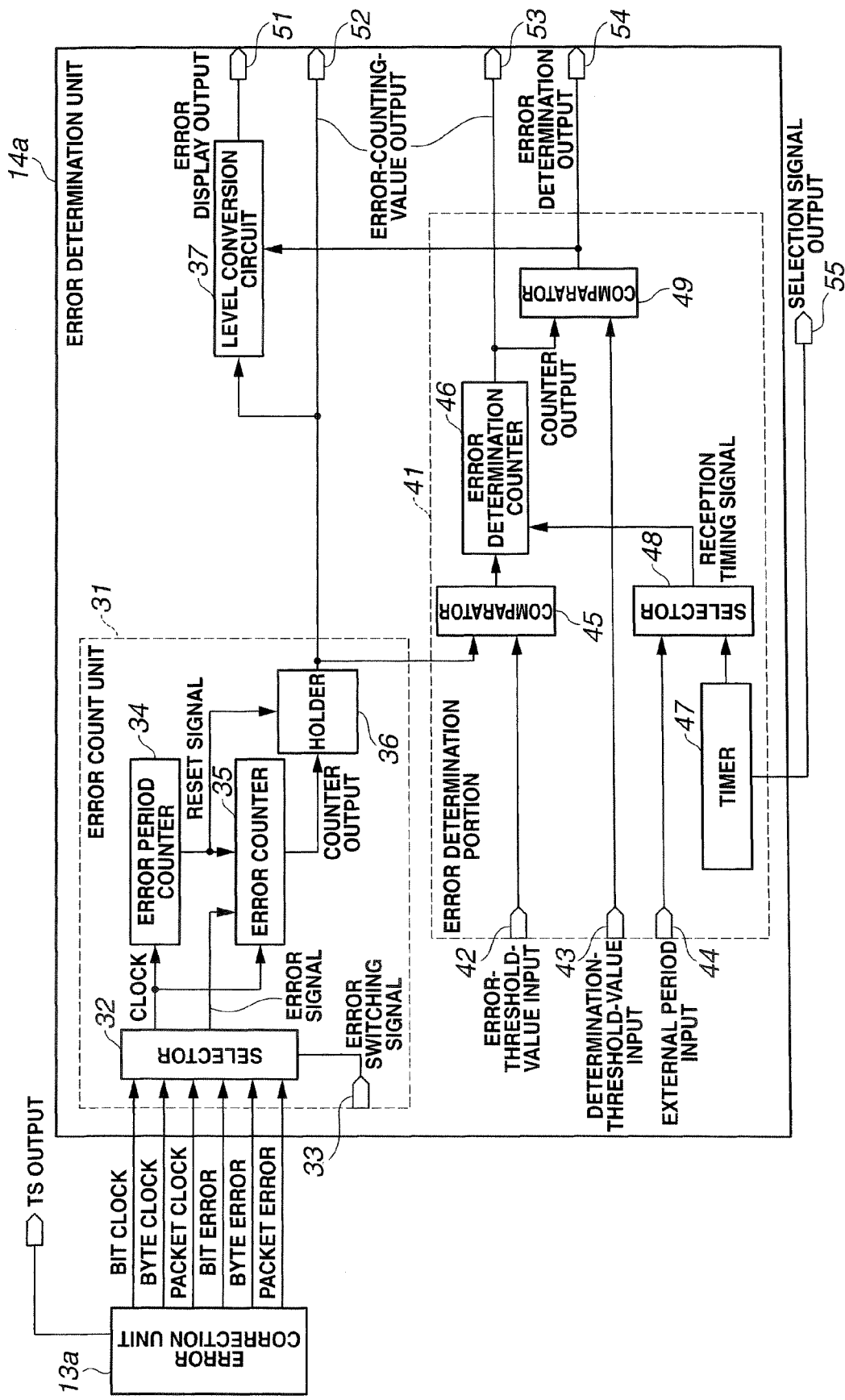
FIG. 3 is a block diagram illustrating a specific example of the specific configurations of error determination units 14a to 14d.

FIG. 3 is a block diagram illustrating an example of the specific configurations of the error determination units 14a to 14d. In addition, the error determination units 14a to 14d have the same configuration; therefore, in FIG. 3, only the error determination unit 14a is illustrated. Additionally, the example in FIG. 3 will be explained on the assumption that a bit error signal, a byte error signal, and a packet error signal are outputted from the error correction unit 13a; however, the present invention can also be applied to a diversity receiver in which one or two kinds of the error signals are outputted.

The error correction unit 13a can perform, e.g., Viterbi decoding processing and Reed-Solomon decoding processing. The error correction unit 13a can perform error correction per bit, by use of Viterbi decoding processing. The error correction unit 13a can output a bit error signal indicating an error per bit that could not be corrected through the Viterbi decoding processing.

Through Reed-Solomon decoding processing, the error correction unit 13a can perform error correction per byte of data that has been error-corrected through the Viterbi decoding processing. The error correction unit 13a can perform error correction of 8 (eight bytes) out of 204, by use of the Reed-Solomon decoding processing; the error correction unit 13a can output the corrected data as a Transport Stream (TS) and a byte error signal indicating an error per byte that cannot be corrected. Moreover, the error correction unit 13a can output a packet error signal indicating a data error per packet that has been be error-corrected through the Reed-Solomon decoding processing.

Still moreover, the error correction unit 13a generates a bit clock pulse, a byte clock pulse, and a packet clock pulse corresponding to the bit error signal, the byte error signal, and the packet error signal, respectively, and supplies the clock pulses to the error determination unit 14a. In addition, the error correction units 13b to 13d have the same configuration as the error correction unit 13a has and can output the error signals, the clock pulses, and the TS outputs, based on the outputs of the branches 11b to 11d.

The error determination unit 14a is configured with an error count unit 31 and an error determination portion 41. The error signals and the clock pulses supplied by the error correction unit 13a are fed to a selector 32 of the error count unit 31. An error switching signal is fed through a terminal 33 to the selector 32; based on the error switching signal, the selector 32 switches selection among the bit error signal and the bit clock pulse, the byte error signal and the byte clock pulse, and the packet error signal and the packet clock pulse.

The clock pulse and the error signal selected by the selector 32 are fed to an error period counter 34 and an error counter 35, respectively. The error period counter 34 counts inputted clock pulses up to a predetermined number of clock pulses and then outputs a reset signal, thereby setting predetermined detection duration. In addition, the number of clock pulses to be counted by the error period counter 34 until the reset signal is outputted may be changed in accordance with the kind of the clock pulse.

The error counter 35 keeps counting of error signals until being resets by the reset signal from the error period counter 34. The error counter 35 outputs to a holder 36 an error-signal counting value, as a counter output, every predetermined detection duration based on the period of the reset signal. The holder 36 outputs a counter output being held and clears the counter output being held in response to the reset signal.

The counter output from the holder 36 can be outputted, as an error-counting-value output, from a terminal 52. In addition, the counter output from the holder 36 is supplied also to a level conversion circuit 37. The counter output by the holder 36 corresponds to the number of errors in the output of each of the branches 11a to 11d, i.e., the reliability of the output of each of the branches 11a to 11d. Accordingly, by utilizing the outputs of the holder 36 so as to determine the respective synthesis proportions for the outputs of the branches 11a to 11d, synthesis can be implemented at the appropriate synthesis proportions in accordance with the respective reliability levels of the outputs of the branches.

Moreover, in Embodiment 1, in order to further enhance the accuracy in determination of the reliability of each of the outputs of the branches, the output of the holder 36 is fed to the error determination portion 41. The counter output from the holder 36 and an error-threshold-value input from a terminal 42 are fed to a comparator 45 in the error determination portion 41. The comparator 45 compares the counter output with the error-threshold-value input and determines whether or not the counter output exceeds a predetermined error threshold value.

It is conceivable that the error signals from the error correction units 13a to 13d include errors. Thus, each time the counter output from the holder 36 exceeds the predetermined error threshold value, the comparator 45 outputs to an error determination counter 46 an output indicating that the counter output from the holder 36 has exceeded the predetermined error threshold value. The error determination counter 46 counts the outputs of the comparator 45 for predetermined determination duration and outputs the result of the counting as a counter output. The counter output is outputted, as an error-counting-value output, from a terminal 53.

A selector 48 sets the determination duration for the error determination counter 46. In other words, an external period input and an internal period input of a predetermined period are fed to the selector 48, through a terminal 44 and from the timer 47, respectively. The selector 48 selects one of the two inputs and outputs the selected input, as a reception timing signal, to the error determination counter 46. The counting value of the error determination counter 46 is reset by the reception timing signal; the error determination counter 46 counts the outputs of the comparator 45 for a determination duration based on the external period input from the terminal 44 or the internal period input from the timer 47. In addition, the timer 47 can output a selection signal through a terminal 55, for the purpose of time-sharing processing described later.

By means of the comparator 45 and the error determination counter 46, the changes in occurrence conditions of error signals from the error correction units 13a to 13d can be detected for sufficiently long determination duration. As a result, the error-incidence situations in the outputs of the branches 11a to 11d can accurately be detected.

Additionally, in order to output whether or not an error exists, as an error determination output, the counter output of the error determination counter 46 is also fed to a comparator 49. A determination-threshold-value input is fed to the comparator 49, by way of a terminal 43. Each time the counter output from the error determination counter 46 exceeds a predetermined determination threshold value, the comparator 49 outputs through a terminal 54 an output, as an error determination output, indicating that the counter output has exceeded the predetermined determination threshold value.

In addition, the error determination output from the comparator 49 is supplied also to a level conversion circuit 37. The level conversion circuit 37 converts the counter output from the holder 36 into an output of a plurality of levels, for the purpose of displaying an error. In this case, the level conversion circuit 37 creates an error display output, by utilizing also the determination result of the error determination of the comparator 49. The error display output from the level conversion circuit 37 is supplied to an unillustrated display unit, by way of a terminal 51.

The error-counting-value outputs from the terminals 52 and 53 and the error determination output from the terminal 54 are fed to the coefficient generation unit 15. The coefficient generation unit 15 computes the coefficient value for each of the coefficient units 16a to 16d of the coefficient device 16, by use of at least one of the error-counting-value outputs from the terminals 52 and 53 and the error determination output from the terminal 54.

The respective error-counting-value outputs from the error determination units 14a to 14d correspond to the error amounts of the outputs of the branches 11a to 11d. The coefficient generation unit 15 sets the coefficients, by which the outputs of the branches 11a to 11d are multiplied, in such a way that the smaller are the respective values of the error-counting-value outputs from the error determination units 14a to 14d, the larger are the corresponding coefficients. In addition, the coefficient generation unit 15 can generate the coefficient in a relatively short time, for example, by use of the error counting value from the terminal 52. Additionally, the coefficient generation unit 15 can accurately generate the coefficient, for example, by use of the error counting value from the terminal 53. Additionally, the coefficient generation unit 15 can set to zero the synthesis proportion of the branch output including an error, for example, by use of the error determination output from the terminal 54. The coefficient generation unit 15 generates four coefficients corresponding to the respective outputs of the branches 11a to 11d and outputs the generated coefficients to the corresponding coefficient units 16a to 16d.

The coefficient units 16a to 16d of the coefficient device 16 receive the respective outputs of the branches 11a to 11d, by way of the delay units 12a to 12d, multiply the outputs of the branches 11a to 11d by the respective coefficients from the coefficient generation unit 15, and then output the resultant values to a synthesizer 17. The synthesizer 17 synthesizes the outputs of the branches 11a to 11d that have been multiplied by the coefficients so as to obtain a single complex symbol data and then outputs the data to an error correction unit 18.

The error correction unit 18 is configured in the same way as the error correction unit 13a is; the error correction unit 18 applies Viterbi decoding processing and Reed-Solomon decoding processing to the inputted complex symbol data and through demapping processing, reproduces the non-demodulated data of the transmitter. The error correction unit 18 outputs a Transport Stream (TS) that is the reproduced data.

Figure 4A:
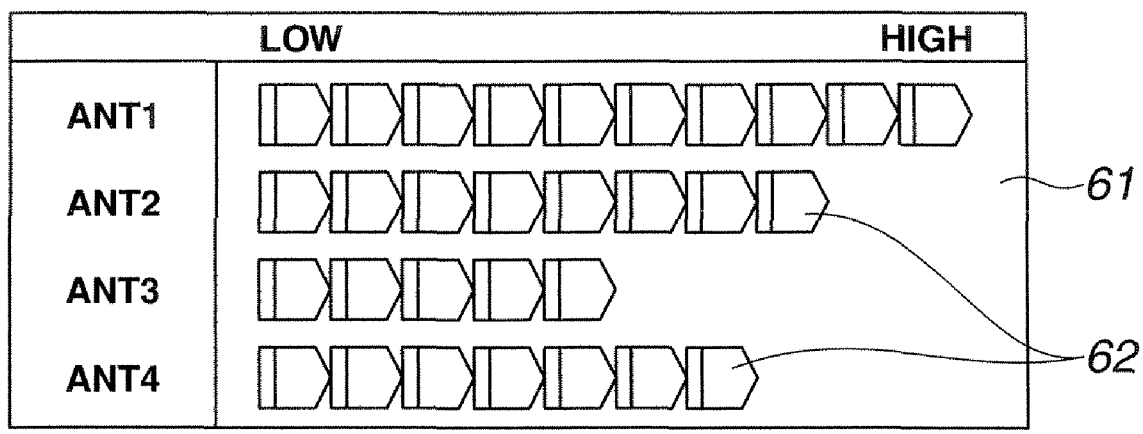
FIGS. 4A and 4B are views for explaining examples of error display.
Figure 4B:
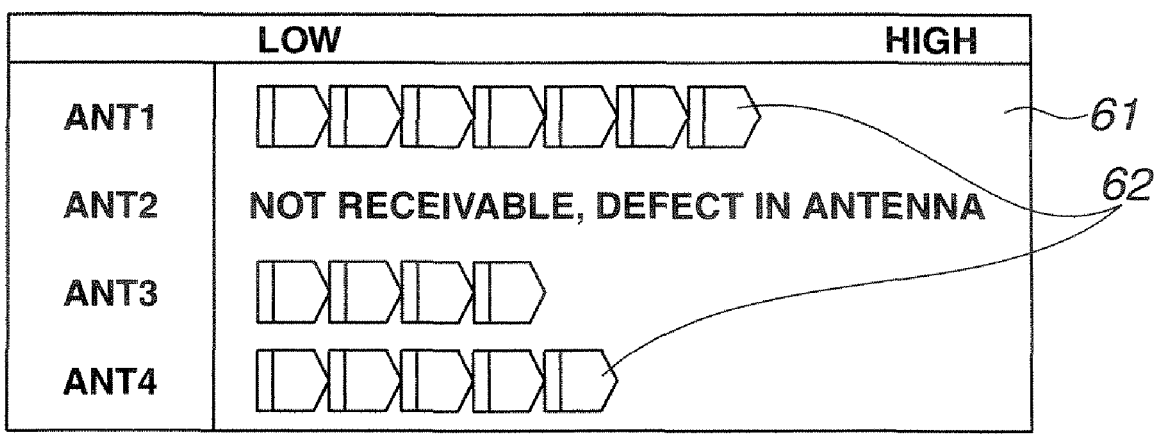
Figure 7:
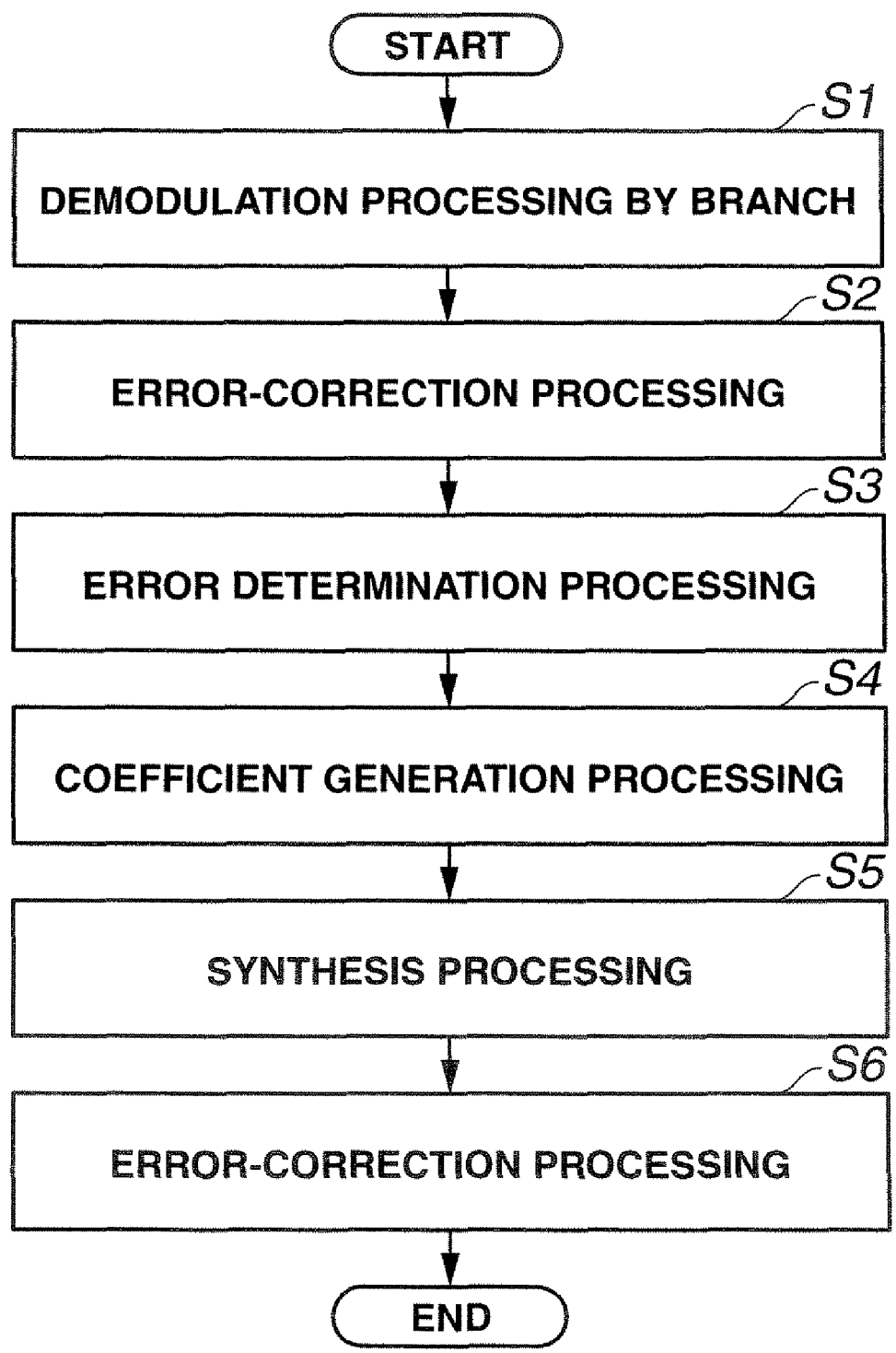
FIG. 7 is a flowchart for explaining the operation of Embodiment 1.

Next, the operation of Embodiment 1 configured as described above will be explained with reference to FIGS. 4A, 4B, and 7. FIGS. 4A and 4B are views for explaining examples of error display. FIG. 7 is a flowchart for explaining the operation.

In Step S1 in FIG. 7, the branches 11a to 11d each perform demodulation processing. In other words, at each of the antennas of the branches 11a to 11d, an RF signal of the digital-broadcast is induced. The branches 11a to 11d each downconverts the RF signal into a baseband signal and then converts the baseband signal into a digital signal. Then, in the FFT unit 25, the branches 11a to 11d each applies FFT processing to a digital complex baseband signal so as to obtain complex symbol data. The respective complex symbol data from the branches 11a to 11d are fed to the corresponding error correction units 13a to 13d.

In Step S2, the error correction units 13a to 13d each apply Viterbi decoding processing and Reed-Solomon decoding processing to the inputted complex symbol data. The error correction units 13a to 13d each output to the corresponding error determination units 14a to 14d error signals indicating errors that remained uncorrected.

In Step S3, the error determination units 14a to 14d each utilize error signals, among the error signals from the corresponding error correction units 13a to 13d, that are designated by the error switching signal. For example, in the case where high-speed processing is required, the selector 32 selects the bit error signal and the bit clock pulse. In addition, for example, in the case where high-accuracy error determination is required, the selector 32 selects the packet error signal and the packet clock pulse.

The error period counter 34 sets, at the error counter 35, detection duration of a predetermined period, and then the error counter 35 counts the number of errors during the detection duration. The holder 36 holds every detection duration the counting value of the error counter 35 and then outputs the counting value through the terminal 52.

In addition, the counter output from the holder 36 is fed also to the comparator 45. The comparator 45 compares the inputted error counting value and the error-threshold-value input from the terminal 42; when the error counting value exceeds the error threshold value, the comparator 45 outputs to the error determination counter 46 an output indicating that an error has occurred. By appropriately setting the error-threshold-value input, reception performance corresponding to the properties of a reception system can be obtained.

The error determination counter 46 is reset by the reception timing signal from the selector 48, counts the outputs of the comparator 45 in a period of the reception timing signal, and outputs the counting values through the terminal 53. By appropriately setting the period of the reception timing signal by use of the external period input or the timer 47, long-term errors can accurately be detected. The counter output from the error determination counter 46 is supplied to the comparator 49 and is compared with the determination-threshold-value input. When the counting value from the error determination counter 46 exceeds the determination-threshold-value input, it is determined that an error exists. By appropriately setting the determination-threshold-value input, whether or not the branch is not enabled to receive can accurately be detected.

Meanwhile, the counter output from the holder 36 is supplied also to a level conversion circuit 37. The level conversion circuit 37 converts the error counting value into outputs of a plurality of levels and outputs the resultant outputs through the terminal 51. The output of the level conversion circuit 37 is supplied to the unillustrated display unit. Based on the outputs indicating the plurality of levels corresponding to the error counting values, the display unit creates error-display data and displays the data on a display screen.

FIGS. 4A and 4B are views illustrating examples of error display. The examples in FIGS. 4A and 4B each represent the error displays indicating on a display screen 61 the respective reception conditions of the branches 11a to 11d. Respective indicators ANT1 to ANT4 on the display screen 61 correspond to the branches 11a to 11d. Level displays 62, which expand and contract in accordance with respective error counting values, are displayed at positions corresponding to the indicators ANT1 to ANT4. The smaller the error counting value is, i.e., the better the reception condition is, the longer the level display 62 is displayed. The example in FIG. 4A represents that the reception condition is best with the branch 11a corresponding to the indicator ANT1 and the reception condition is worst with the branch 11c corresponding to the indicator ANT3.

In addition, the error determination output from the comparator 49 is also fed to the level conversion circuit 37; for the branch output that has been determined to be erroneous by the error determination output, the level conversion circuit 37 outputs an output having a level corresponding to the lowest level. FIG. 4B illustrates this particular case, i.e., it is represented that the branch 11b corresponding to the indicator ANT2 is in a poor reception condition and defective reception is caused.

The error-counting-value outputs and the error determination output from the terminals 52 to 54 of each of the error determination units 14a to 14d are fed to the coefficient generation unit 15. In Step S4, the coefficient generation unit 15 computes the coefficient value for each of the coefficient units 16a to 16d of the coefficient device 16, by use of at least one of the error-counting-value outputs and the error determination output. The coefficient values from the coefficient device 16 correspond to the error-incidence situations of the respective outputs of the branches 11a to 11d. In other words, the coefficient generation unit 15 generates a coefficient with which the synthesis proportion for the branch output is raised in reverse proportion to the number of errors.

The coefficient generation unit 15 generates four coefficients corresponding to the respective outputs of the branches 11a to 11d and outputs the generated coefficients to the corresponding coefficient units 16a to 16d. The coefficient units 16a to 16d multiply the outputs of the branches 11a to 11d by the respective coefficients and outputs the products to the synthesizer 17. In Step S5, the synthesizer 17 synthesizes the outputs of the branches 11a to 11d that have been multiplied by the coefficients so as to obtain a single complex symbol data and then outputs the data to an error correction unit 18.

As a result, the complex symbol data, which is synthesized at the optimal synthesis proportions in accordance with the error-incidence situations, is supplied to the error correction unit 18. In Step S6, the error correction unit 18 applies Viterbi decoding processing and Reed-Solomon decoding processing to the inputted complex symbol data and through demapping processing, reproduces the non-modulated data of the transmitter. The error correction unit 18 outputs a Transport Stream (TS) that is the reproduced data.

As discussed above, in embodiment 1, the respective synthesis proportions for the branch outputs area determined based on the error-correction results for the branch outputs; therefore, without being affected by noise and the like, the optimal synthesis proportions, which are in accordance with the respective reception situations of the branches, can be set. Accordingly, the quality of the reproduced information signal can be enhanced.

In addition, in Embodiment 1, the error correction units 13a to 13d can output TS's; the error correction units 13a to 13d can also output respective TS's based on the branch outputs.

Meanwhile, in Embodiment 1, the error correction unit and the error determination units are provided for respective branches. However, the circuit scale of the error correction unit is extremely large. Thus, by preparing a system of an error correction unit and an error determination unit and feeding, in a time-division fashion, the respective branch outputs to the system, coefficients maybe generated in the coefficient generation unit. For example, in error correction processing in which a mobile-terminal broadcasting signal is received by utilizing only part of the reception bandwidth, the amount of error correction processing is relatively small. In the partial reception or the like, even in the case where a system of an error correction unit and an error determination unit is utilized in a time-division fashion, diversity synthesis coefficients can be generated with sufficient accuracy. In addition, the selection signal for time division can be generated from the timer 47.

FIG. 5 is a block diagram illustrating Embodiment 2 of the present invention. In FIG. 5, constituent elements identical to those in FIG. 1 are designated by the same reference characters and the explanation therefor will be omitted. Embodiment 2 enables the circuit scale to be reduced, by utilizing in a time-division fashion a system of an error correction unit and an error determination unit. In addition, in Embodiment 2, by concurrently applying a coefficient-generation method utilizing the detection results for branch-out S/N's, the accuracy of coefficient generation is raised.

In Embodiment 2, the outputs of the delay units $12a$ to $12d$ are fed to an S/N detector 70. The S/N detector 70 has S/N detection units $70a$ to $70d$; the S/N detection units $70a$ to $70d$ detect the respective S/N's of the outputs of the delay units $12a$ to $12d$ and output the detection results to a coefficient-generation unit 75.

In addition, in Embodiment 2, the outputs of the branches $11a$ to $11d$ are fed also to an error determination device 71. The outputs of the branches $11a$ to $11d$ are fed to a selection unit 72 of the error determination device 71; the selection unit 72 selects the outputs of the branches $11a$ to $11d$ in a time-division fashion and outputs the selected outputs to an error correction unit 73.

The error correction unit 73, which has the same configuration as the error correction unit $13a$ has, corrects errors in the inputted data and outputs to an error determination unit 74 an error signal that is the result of error correction. Additionally, as is the case with the error correction unit $13a$, the error correction unit 73 can output at least one of a bit error signal, a byte error signal, and a packet error signal.

The error determination unit 74, which has the same configuration as the error determination unit $14a$, determines the error-incidence situations of the respective outputs of the branches $11a$ to $11d$, based on the error signals from the error correction unit 73, and output the determination results to the coefficient generation unit 75.

The coefficient generation unit 75 generates a coefficient by which each branch output is multiplied, based on the S/N-detection result, for each branch output, from the S/N detector 70 and the error-incidence situation, for each branch output, from the error determination device 71.

For example, the coefficient generation unit 75 may correct a coefficient obtained based on the S/N-detection result, in accordance with the error-incidence situation for each branch output, so as to generate a corrected coefficient. For example, the coefficient generation unit 75 may multiply a coefficient obtained based on the S/N-detection result by a coefficient that is in reverse proportion to the error counting value so as to utilize the product for synthesis.

Figure 6A:
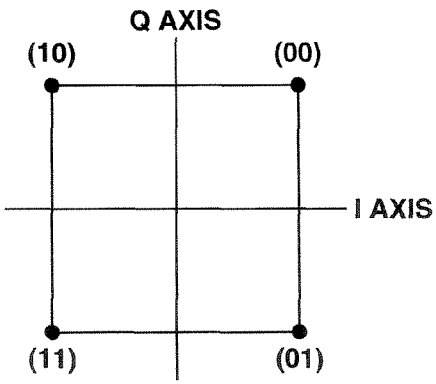
FIGS. 6A to 6C are explanatory views illustrating constellations that represent respective situations in which symbols are geometrically arranged.
Figure 6B:
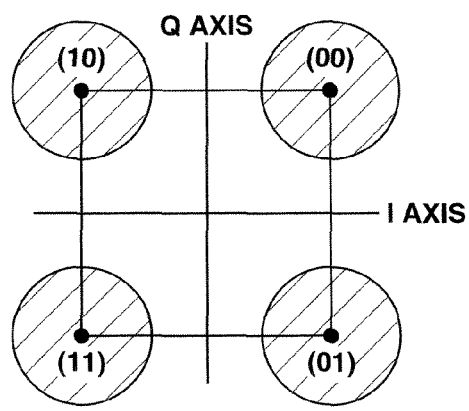
Figure 6C:
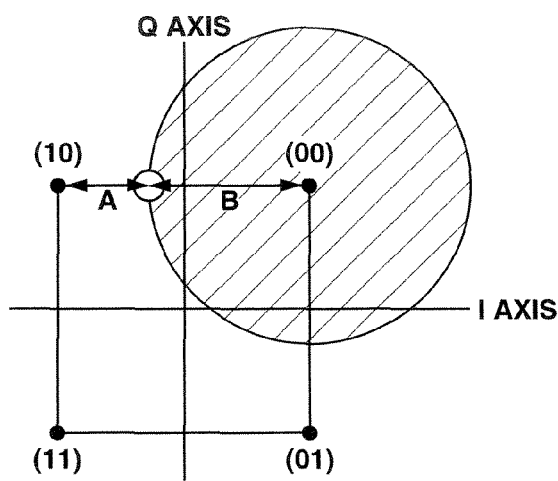

Next, the operation of Embodiment 2 configured as described above will be explained with reference to FIGS. 6A to 6C. FIGS. 6A to 6C are explanatory views illustrating constellations that represent respective situations in which symbols are geometrically arranged. FIG. 6A illustrates only a symbol arrangement; FIGS. 6B and 6C illustrate how to detect S/N's.

The respective outputs of the branches $11a$ to $11d$ are fed through delay units $12a$ to $12d$ to the S/N detection units $70a$ to $70d$. The S/N detection units $70a$ to $70d$ detect the respective S/N's of the outputs of the branches $11a$ to $11d$. Here, it is assumed that QPSK modulation is employed at the transmitter. FIG. 6A illustrates the positions of symbols in the QPSK-modulation constellation. Here, it is assumed that the branch output includes noise signals indicated by the hatched areas in FIG. 6B. In other word, it is assumed that each branch output has a value corresponding to a position within one of the respective hatched areas covering four symbols in FIG. 6B.

In the S/N detection units $70a$ to $70d$, for example, noise components included in a reception signal are defined as the quantified differences (distances) between the respective symbols and reception data, and the reciprocal of the average value of the noise components is employed ad an S/N value.

The coefficient generation unit 75 computes synthesis coefficients, based on the respective S/N values from the S/N detector 70. For example, it is assumed that the S/N values from the S/N detection units $70a$ to $70d$ are given by the equation (1) below:

The average value of noise in the branch $11a$ output=10, and $S/N$ value=$1/10$=0.10

The average value of noise in the branch $11b$ output=5, and $S/N$ value=$1/5$=0.20

The average value of noise in the branch $11c$ output=5, and $S/N$ value=$1/5$=0.20

The average value of noise in the branch $11d$ output=2, and $S/N$ value=$1/2$=0.50 (1)

In this case, for example, the coefficient generation unit 75 utilizes the ratio of the S/N values as the synthesis coefficients. For example, the coefficient generation unit 75 generates 0.10, 0.20, 0.20, and 0.50 as the synthesis coefficients fed to the respective coefficient units $16a$ to $16d$.

However, when the noise level is large, the S/N detection result may include an error. FIG. 6C illustrates an example in which, because the noise that has intruded into a reception signal of the symbol (00) is large, the branch output is located at the position indicated by the white circle. Also in this case, the S/N detection units $70a$ to $70d$ obtain the differences between the respective symbols and reception data, and distance A is smaller than distance B; therefore, noise is obtained on the assumption that the branch output is data of the symbol (10). That is to say, when the coefficients are generated based on only the outputs of the S/N detection units $70a$ to $70d$, a relatively large coefficient may be given, even though the coefficient should originally be a considerably small synthesis coefficient.

Thus, in Embodiment 2, the synthesis coefficients in the coefficient generation unit 75 are corrected by use of the outputs of the error determination unit 74. The respective outputs of the branches $11a$ to $11d$ are selected in a time-division fashion by the selection unit 72 and then fed to the corresponding error correction unit 73. The error correction unit 73 generates error signals and outputs the error signals to the error determination unit 74. The error determination unit 74 counts the error signals and then outputs the error-counting-value outputs and the error determination output, through the terminals 52 to 54 in FIG. 3.

The error-counting-value output corresponding to the white-circle data in FIG. 6C is considerably large, and the error determination output has a value indicating an error. Based on the error-counting-value outputs and the error determination output, the coefficient generation unit 75 corrects each of the coefficients based on the outputs of the S/N detection units $70a$ to $70d$. For example, based on the error determination output that is a signal indicating whether or not an error is included in the branch output, the coefficient generation unit 75 may set the coefficient for the output of the branch including an error to zero and utilize the ratio of S/N values obtained by the S/N detection units $70a$ to $70d$, as the synthesis coefficients for the respective output of the branches including no errors. In addition, for example, the coefficient generation unit 75 may obtain the synthesis coefficients, based on the proportions obtained by multiplying the S/N values from the S/N detection units $70a$ to $70d$ by the respective error-counting-value outputs for the output of the branches.

As a result, the synthesis coefficient for the white-circle data in FIG. 6C becomes zero or a considerably small value.

The synthesis coefficients from the coefficient generation unit 75 are fed to the respective coefficient units 16a to 16d of the coefficient device 16.

As discussed above, in Embodiment 2, the same effect as that of Embodiment 1 can be demonstrated, and because Embodiment 2 is configured only with a system of an error correction unit and an error determination unit, the circuit scale can considerably be reduced. Also in this case, by concurrently utilizing a method of computing coefficients by means of S/N detection, synthesis coefficients can accurately be detected, whereby data including few errors can be reproduced.

In addition, in Embodiment 2, the error determination unit 74 performs error determination, while switching, e.g., by the output of the timer 47, the branch outputs in an arbitrary period; therefore, the error determination unit 74 cannot perform real-time error determination on all the branch outputs. However, even in this case, it is possible to detect the branch reception though which is not available due to any error. Moreover, in the case where only the bit error signals are utilized, it is almost possible to perform real-time error determination on all the branch outputs. Still moreover, in the case where Embodiment 2 is applied to the foregoing partial reception, real-time error determination on all the branch outputs can be performed.

In addition, also in Embodiment 2, the error correction unit 73 can output a TS; when the selection unit 72 fixedly selects a single branch output, the error correction unit 73 can output a TS based on the selected branch output. In this case, it is also possible to make a specific branch function as a receiver while the other branches serve for diversity reception. Moreover, Embodiment 2 is configured so as to be operated also as a stationary receiver in which, by making the coefficient generation unit feed a coefficient of 1 to a specific branch output, two channels of TS outputs, i.e., a TS output from the error correction unit 73 and a TS output from the error correction unit 18, can be outputted.

Still moreover, it goes without saying that, by combining Embodiment 1 and Embodiment 2 so that the outputs of the error determination device 14 in Embodiment 1 are supplied to the coefficient generation unit 75 in Embodiment 2, the synthesis coefficients may accurately be obtained.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A diversity receiver comprising:
   an error correction device configured to error-correct respective demodulated outputs fed thereto from a plurality of branches that demodulate respective reception signals from a plurality of antennas and to generate error information on error-uncorrectable data,
   wherein the error correction device outputs, with regard to the respective demodulated outputs from the plurality of branches, at least one of a bit error signal that indicates an error per bit, a byte error signal that indicates an error per byte, and a packet error signal that indicates an error per packet;
   an error determination device configured to determine error-incidence situations for the respective demodulated outputs, based on error information from the error correction device,
   wherein the error determination device has a selector that selects one of a bit error signal that indicates an error per bit, a byte error signal that indicates an error per byte, and a packet error signal that indicates an error per packet, from the error correction device, in order to determine the error-incidence situations for the respective demodulated outputs; and
   a coefficient generation unit configured to obtain synthesis coefficients for the respective demodulated outputs, based on the results of determination by the error determination device.

2. The diversity receiver according to claim 1, wherein the error correction device has a plurality of error correction units configured to error-correct the respective demodulated outputs from the plurality of branches and to generate error information on error-uncorrectable data, and the error determination device has a plurality of error determination units configured to determine the error-incidence situations for the respective demodulated outputs, based on error information from the plurality of error correction units.

3. The diversity receiver according to claim 1, wherein the error correction device and the error determination device have an error correction unit and an error determination unit, respectively, that are configured in a system and deal with the respective demodulated outputs from the plurality of branches in a time-division fashion.

4. The diversity receiver according to claim 1, wherein the error correction device performs at least one of the Viterbi decoding processing and the Reed-Solomon decoding processing.

5. The diversity receiver according to claim 1, wherein the error determination device determines the error-incidence situations for the respective demodulated outputs, by utilizing at least one of a bit error signal that indicates an error per bit, a byte error signal that indicates an error per byte, and a packet error signal that indicates an error per packet, from the error correction device.

6. The diversity receiver according to claim 1, wherein the error determination device has an error counter configured to count an error signal selected by the selector and determines an error situation, based on the counting value of the error counter.

7. The diversity receiver according to claim 6, wherein the error determination device outputs error-display data corresponding to the counting value of the error counter.

8. The diversity receiver according to claim 6, wherein the error determination device has an error determination counter configured to count the number of times of counting value of the error counter exceeding a preliminarily set error threshold value, during a predetermined duration, and determines an error situation, based on the counting value of the error determination counter.

9. The diversity receiver according to claim 8, wherein the error determination device outputs error-display data corresponding to the counting value of the error determination counter.

10. The diversity receiver according to claim 8, wherein the error determination device determines that an error has occurred, when a counting value of the error determination counter exceeds the preliminarily set determination threshold value.

11. The diversity receiver according to claim 8, wherein the coefficient generation unit obtains synthesis coefficients for the respective demodulated outputs, based on counting values of the error determination counter.

12. The diversity receiver according to claim 6, wherein the coefficient generation unit obtains synthesis coefficients for the respective demodulated outputs, based on counting values of the error counter.

13. The diversity receiver according to claim 1, further comprising a signal-to-noise ratio detector configured to obtain signal-to-noise ratios of the respective demodulated outputs from the plurality of branches, wherein the coefficient generation unit obtains synthesis coefficients for the respective demodulated outputs, based on the results of detection by the signal-to-noise ratio detector and the results of determination by the error determination device.

14. A diversity reception method comprising:
error-correcting respective demodulated outputs fed from a plurality of branches that demodulate respective reception signals from a plurality of antennas and generating error information on error-uncorrectable data;
determining error-incidence situations for the respective demodulated outputs, based on the error information; and
obtaining synthesis coefficients for the respective demodulated outputs, based on the results of determination of error-incidence situations,
wherein the generating the error information is outputting, with regard to the respective demodulated outputs from the plurality of branches, at least one of a bit error signal that indicates an error per bit, a byte error signal that indicates an error per byte, and a packet error signal that indicates an error per packet, and
wherein the determining the error-incidence situations is determining error-incidence situations for the respective demodulated outputs, by utilizing one error signal selected among the bit error signal that indicates an error per bit, a byte error signal that indicates an error per byte, and a packet error signal that indicates an error per packet.

15. The diversity reception method according to claim 14, wherein the determining the error-incidence situations is determining error situations, based on the results of counting of the selected error signals.

* * * * *